United States Patent [19]

Marchant et al.

[11] Patent Number: 4,947,340
[45] Date of Patent: Aug. 7, 1990

[54] INSTRUMENT FOR THE MEASUREMENT AND DETERMINATION OF CHEMICAL PULSE COLUMN PARAMETERS

[75] Inventors: Norman J. Marchant; John P. Morgan, both of Idaho Falls, Id.

[73] Assignee: The United States of America as represented by the United States Department of Energy, Washington, D.C.

[21] Appl. No.: 238,661

[22] Filed: Aug. 31, 1988

[51] Int. Cl.$^5$ .............................................. G06F 15/20
[52] U.S. Cl. .................................... 364/500; 364/502; 364/558
[58] Field of Search ........................ 364/500, 502, 558; 365/116; 92/84; 73/61.1 R, 597, 439, 302; 210/634; 204/306

[56] References Cited

U.S. PATENT DOCUMENTS

| | | |
|---|---|---|
| 3,862,408 | 1/1975 | Bolt ..................................... 364/558 |
| 4,063,131 | 12/1977 | Miller ................................. 365/116 |
| 4,087,805 | 5/1977 | Miller ................................. 365/116 |
| 4,321,856 | 3/1982 | Gase ...................................... 92/48 |
| 4,526,035 | 7/1985 | Auchapt et al. ..................... 73/302 |
| 4,571,299 | 2/1986 | Silvis ................................. 210/634 |
| 4,574,615 | 3/1986 | Bower et al. ......................... 73/597 |
| 4,636,290 | 1/1987 | Bethuel et al. ..................... 204/306 |
| 4,726,221 | 2/1988 | Tavlarides et al. ................... 73/597 |

Primary Examiner—Kevin J. Teska
Assistant Examiner—Ellis B. Ramirez
Attorney, Agent, or Firm—Bradley Smith; John M. Albrecht; William R. Moser

[57] ABSTRACT

An instrument for monitoring and measuring pneumatic driving force pulse parameters applied to chemical separation pulse columns obtains real time pulse frequency and root mean square amplitude values, calculates column inch values and compares these values against preset limits to alert column operators to the variations of pulse column operational parameters beyond desired limits.

19 Claims, 3 Drawing Sheets

INSTRUMENT FOR THE MEASUREMENT AND DETERMINATION OF CHEMICAL PULSE COLUMN PARAMETERS

CONTRACTUAL ORIGIN OF THE INVENTION

The United States Government has rights to this invention pursuant to Contract No.DE-AC07-84ID-12435 with the U.S. Department of Energy.

BACKGROUND OF THE INVENTION

The present invention relates to pulse columns used in solvent extraction processes, and more specifically to a control device for use in regulating and monitoring the operation of a pneumatic pulser designed to provide pulse activity in a nuclear reactor fuel by-product extraction system.

Fuel elements, or assemblies, discharged from nuclear reactors contain significant quantities of uranium and plutonium isotopes which are still fissionable and present an energy source which is desirable to recover in many cases. The most common method utilized to reclaim this fissionable material is by dissolving the spent fuel and then passing the aqueous dissolution product through a solvent (liquid-liquid) extraction process. The heavy metals (uranium and plutonium) are thus separated from other fission products and impurities during the solvent extraction process.

In a typical solvent extraction process used in the separation of radioactive heavy metals from an aqueous solution, the radioactive solutes ordinarily enter the system in an aqueous phase. At least some of the solutes are extracted into an organic phase, sometimes called the solvent. The organic phase or solvent may consist of a single substance, but frequently it contains one or more extractants and may include a diluent and sometimes a diluent modifier. The extracted solutes are subsequently removed from the organic phase by adjustment of chemical conditions such that stripping, also known as back extraction, occurs into an aqueous phase separate from the original feed stream.

Typical solvent extraction apparatus may be described as a series of interconnecting chambers in a linear arrangement or cascade. The aqueous phase is fed into the cascade at one end and the organic phase is fed into the cascade at the opposite end. Thus the aqueous phase and the organic phase move through the cascade in a continuous and counter-current flow pattern, with the aqueous and organic components interacting with each other in each chamber. In each chamber of the cascade, a portion of the desirable fission by-products is extracted into the solvent and thus removed from the aqueous phase. The cascade is designed so that the aqueous phase inlet and organic phase outlet are at the same end, and the aqueous phase outlet and the organic phase inlet are located together at the opposite end. At the aqueous phase outlet end, substantially all of the desirable products have been removed from the aqueous phase. Further, at the organic phase outlet end, the organic phase is withdrawn from the cascade in a substantially loaded condition, with the desirable heavy metal by-products contained therein. Subsequent chemical processing operations are used to further separate the fissionable products from the solvent solution.

Among the mechanisms generally used to practice solvent extraction is the pulse column. A pulse column is a liquid-liquid contactor having a generally vertical cylindrical body or tower in which the rate of mass transfer is enhanced by hydraulic pulsation of the liquids in the column through a series of perforated plates. In conventional pulse columns, a rapid reciprocating motion of relatively short amplitude is applied to the liquid contents of the column. An air pulser is normally employed to power this reciprocating motion and the consequential interaction of the aqueous and organic phases. Air pulse agitation has been found to give improved rates of extraction and to reduce tower heights compared to the dimensions of the former packed column type of apparatus.

Two major extraction parameters are affected by pulse energy: total volumetric throughput and mass transfer efficiency. The pulse action forces organic solution upward through the plates and simultaneously pushes the aqueous phase downward Pulse energy supplied to the column is a function of frequency and amplitude, and the maintenance of designated frequency and amplitude values is critical to efficient pulser operation. As pulse energy is increased, total throughput increases to a maximum and then decreases. Unstable pulser operation can be identified by localized solvent-/aqueous phase inversions along the length of the column. If such inversions become large enough, complete flooding of the column may occur. The most efficient mass transfer is obtained when interfacial solvent/aqueous phase area, formation of new interfacial area, and turbulence are maximized.

Conventional pulse column control units measure a peak amplitude of the pulse and frequency and combine these two values in linear fashion to obtain a resultant value in column inches. Such measuring devices only measure a "peak" or "valley" of a frequency curve or a pulse curve, and do not have any mechanism for measuring a duration of a pulse, i.e. narrow pulses can be given the same amplitude value as long pulses. Thus, by following the peaks only of the pulse amplitudes, conventional pulse monitoring and control devices often obtain inaccurate results. If the pulsing operation is not monitored accurately, the potentially damaging and inefficient consequences described previously may easily result.

Thus, it is evident that accurate knowledge of the frequency/amplitude product is of great concern in achieving acceptable pulse column operation. As such, there is a need for a device capable of accurately monitoring pulse amplitude and frequency, as well as pulse duration.

SUMMARY OF THE INVENTION

An instrument adapted to measure and monitor the low frequency pneumatic driving force pulse parameters applied to chemical separation pulse columns includes components adapted to determine the pulse signal frequency and the root mean square (RMS) value of the pulse signals, to utilize the frequency and RMS value to calculate desired pulse column parameters, such as pulse column inches, and to compare the calculated values with preset limits to determine whether the calculated values are beyond the preset limits. If so, the instrument is adapted to generate audible or visual alarms to alert pulse column operators of the discrepancy in desired pulse column performance. The use of RMS values provides a more accurate indication of pulse energy and duration than was obtained through conventional frequency and amplitude measurements.

DESCRIPTION OF THE PREFERRED EMBODIMENT

Figure 1:
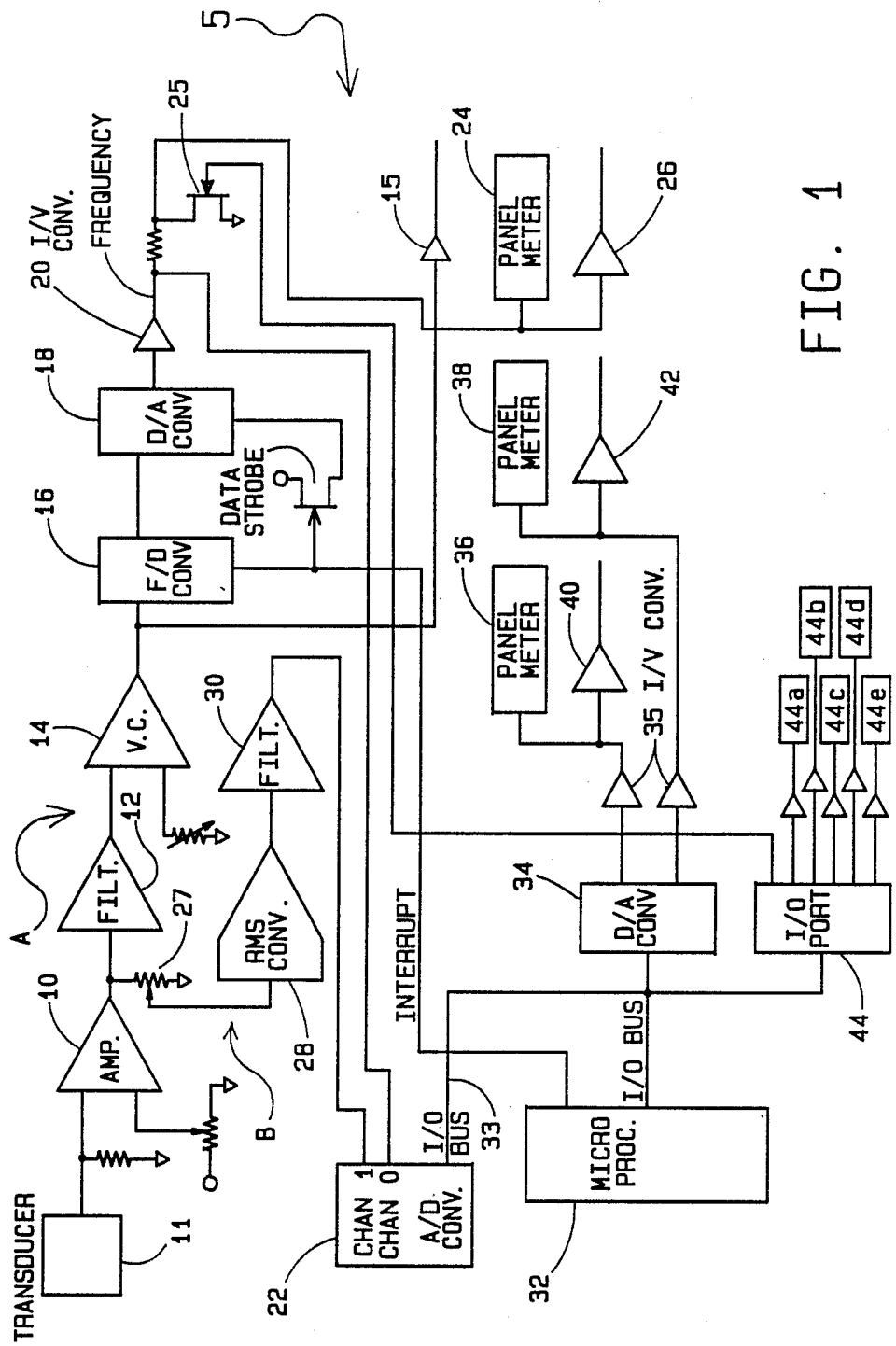
FIG. 1 is a detailed block circuit diagram of an instrument embodying the present invention.

Referring to FIG. 1, a block diagram of the circuitry of the pulser electronic monitoring system 5 of the invention is depicted. An instrumentation amplifier 10 receives pulsating voltage signals from a pressure transducer 11 monitoring the pneumatic pressure applied to the chemical column by a pulser mechanism (column and pulser not shown). The electrical pulse signal is in the approximate range of 1 to 5 volts and is proportional to the pressure of 0 to 10 PSI applied to the column by the pulser.

The amount of pressure applied to the column is adjustable by operating personnel as to both amplitude and frequency, but not to duty cycle ratio. The duty cycle ratio is the ratio of the duty cycle or work performed compared to one entire cycle of a wave (i.e. peak edge-to-like peak edge), also known as the period. Duty cycle is conventionally mechanically set to be approximately 50% of the period, and a waveform with a 50% duty cycle is commonly called a square wave. The instrument amplifier 10 provides signal gain and offset to alter the input signal range of 1 to 5 volts to 0 to 10 volts for the following signal processing.

The signal output from the amplifier 10 is split into two separate paths. In the first path, generally designated 'A', frequency components above a predetermined limit (e.g. 15 Hz in the illustrated embodiment) are removed by means of an active filter 12. The active filter 12 is adapted to remove nearly all frequencies but the fundamental pulse frequency from the square signal wave transmitted by the amplifier 10. The resultant 'clean' waveform is applied to a voltage comparator 14. The output of the comparator 14 is a sharply rising and falling pulse of fixed high and low voltage levels which reaches a high level when the input signal voltage exceeds a preset threshold level. The voltage output of the comparator 14 returns to a low level when the input signal voltage is below the threshold level. Thus, the voltage comparator 14 generates a signal with a pulse width dependent on input signal levels and having relatively sharp edges suitable for determining the frequency of the input signal. The input pulses are indicated on a front panel of the instrument by an indicator 15.

The output of the comparator 14 is applied to a frequency-to-digital converter 16. This commercially available integrated circuit (e.g. Custom Micro Systems, Inc., Box 9472, Livonia, Mich. 48151, Model No. CMS1000 Series) includes a microprocessor (not shown) with built-in firmware adapted to determine frequency by measuring the period of the input waveform. The microprocessor of the converter 16 is particularly suitable for determining the frequency of low frequency signals, and its output is the running average of the last 16 pulse measurements. In the case of pulse columns, frequencies typically operate from 0.5 to 1.5 cycles per second. The output of the converter 16 is a 10 bit digital word that represents the frequency of the applied input signal. A digital-to-analog converter 18 coupled to an amplifier 20 converts the 10 bit digital signal to an equivalent analog output voltage. The analog representation of the frequency is then sent to a first input (designated "CHAN 0") of a combined 4 channel analog multiplexer and analog-to-digital converter 22, a front panel frequency display 24 and a 4 to 20 milliamp loop driver 26 for use with a recorder (not shown). A reset transistor 25 is connected between the amplifier 20 and the meter 24 to prevent the display of frequency readings which are not representative of pulser operation.

To this point, the signal path 'A' for the determination of the input frequency has been described. The second signal path 'B' is coupled to the output of the instrument amplifier 10 via a variable resistor 27, as shown. In signal path 'B', the amplitude of the input signal is processed into its root mean square (RMS) equivalent value by an RMS converter 28. The RMS converter 28 is a commercially available integrated circuit, (e.g. Analog Devices, Inc., 1 Technology Way, P.O. Box 9106, Norwood, Mass., 02062, Model No. AD-637) that, with suitably selected external components, will provide an analog output voltage proportional to the RMS value of the input waveform amplitude. Because of the low frequency signals involved, determining the RMS value to the required precision does present some difficulties, and further analog processing through a two pole active filter 30 is utilized in the illustrated embodiment. The filtered RMS signal value, representing the pressure of the pulse, is applied to the second input of the analog-to-digital converter 22 (designated "CHAN 1").

Under program control, the converter 22 selects the desired analog input for conversion to an equivalent digital value that is then transmitted to a microprocessor 32 through an Input/Output (I/O) bus 33. The digital data available to the microprocessor 32 is the RMS "pressure" or amplitude value and the frequency of the pulse column driving pulse. This is in contrast to conventional pulse control systems, wherein pulse frequency and amplitude are measured and multiplied to provide an index of column inches. One advantage of the RMS value obtained by the present invention is that wider pulses can be more easily differentiated from narrower pulses at the same amplitude. This results in a more accurate measurement of pulse column performance. Furthermore, two additional channels of the analog multiplexer 22 are available for the measurement and monitoring of other column parameters, such as column weight or liquid level.

The microprocessor 32 is a single integrated circuit with on-board BASIC language, and uses the pulse information received and processed by signal paths A and B to calculate the column operating parameters of interest. The microprocessor 32 outputs the digital information to a digital-to-analog converter 34. The analog information goes through a pair of amplifiers 35, to two panel meters 36, 38, respectively and respective 4–20 milliamp loop drivers 40, 42 for process recorders (not shown) which are used to provide information display and recording capability.

The microprocessor program also compares the calculated values against preset limits for the generation of alarms or process shutdown trips if the column operation is found to be out of tolerance. An I/O port 44 performs the setting and latching of these alarms or trips via input from the microprocessor I/O bus 33. The port 44 alarms and indicators are designated as a front panel run indicator 44(a), a front panel error indicator 44(b), a front panel low alarm indicator 44(c), a front panel high alarm indicator 44(d) and a front panel trip indicator 44(e). The reset transistor 25 is connected to the I/O port 44 as an output disable to prevent the indicators 44(a)-44(e) from displaying any inaccurate off-scale readings during instrument start-up. The I/O port 44 may also be adapted to cause a pulser shut-down upon the occurrence of certain specified alarm conditions.

The entire electronics package depicted in FIG. 1, including the panel display units, may be contained within a 4" wide X 7½" high X 9½" deep standard Nuclear Instrument Module (NIM) (not shown).

Figure 2A:
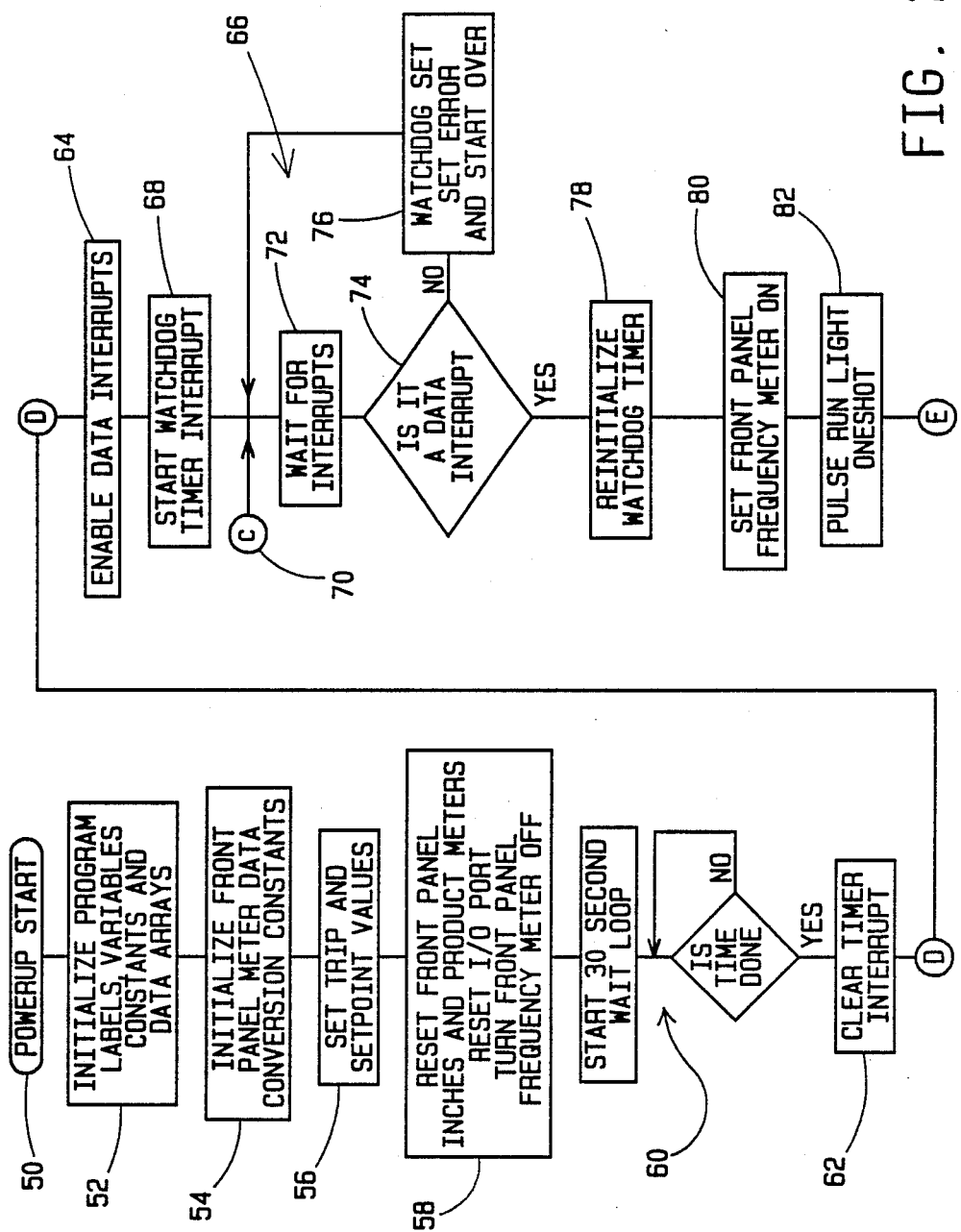
FIGS. 2A and 2B depict a flow chart describing the method of operation of the instrument embodying the invention.
Figure 2B:
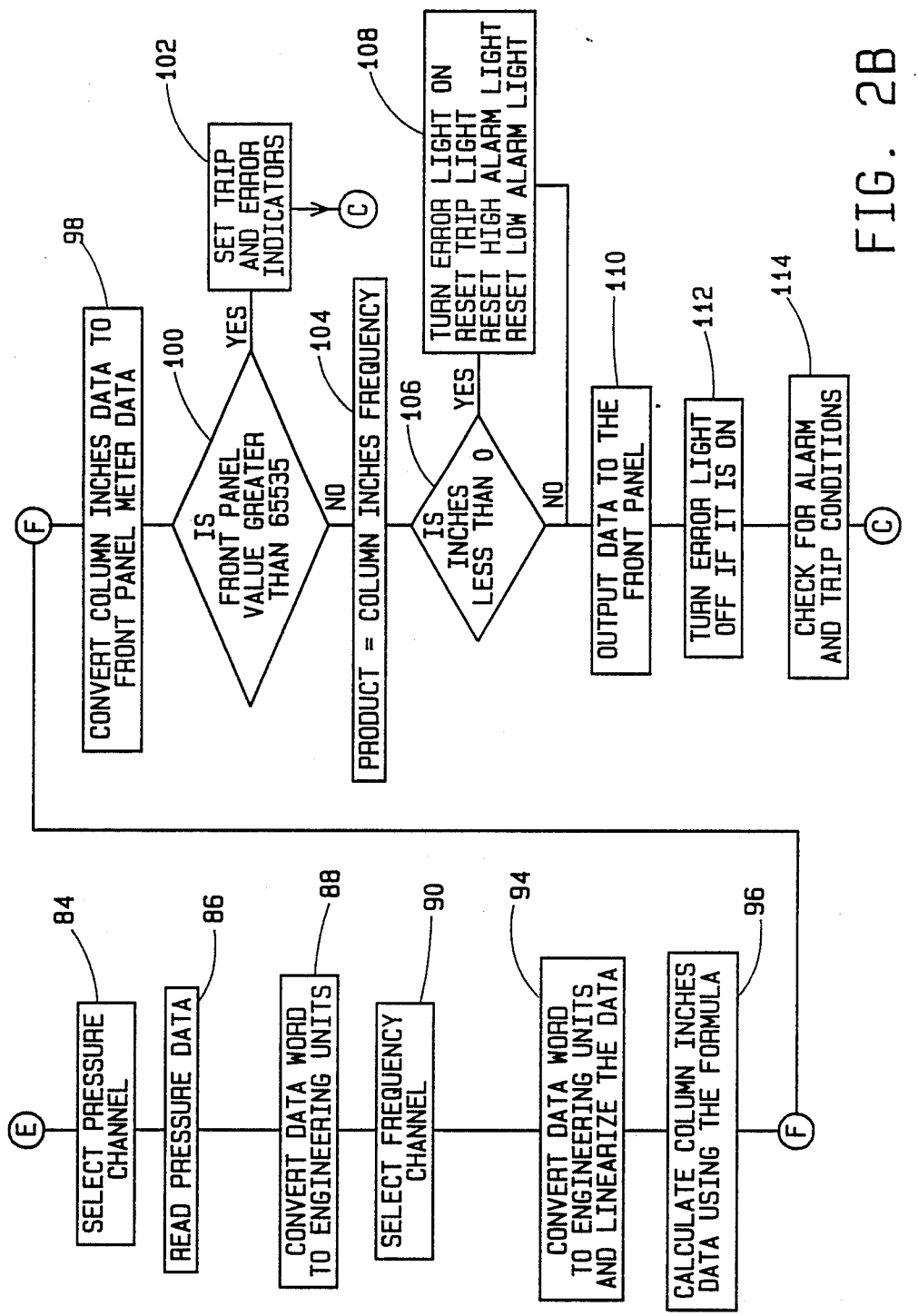

FIGS. 2A and 2B depict a block diagram of the software program used to operate the pulse column control instrument of the invention. In FIG. 2A, block 50 turns on the instrument in response to being powered up. Block 50 triggers the operation of initialization blocks 52, 54 and 56 which respectively set the initial program labels, variables, constants and data arrays, initialize the front panel meter data conversion constants and set the alarm trip and set point values.

The next step is indicated by block 58 which resets the front panel meters 24, 36, 38 and any other desired meters with the assistance of the reset transistor 25. Due to the inaccuracy of input readings upon the start-up of the instrument, the I/O port 44 bit zero is set and the front panel frequency meter is turned off since an actual frequency measurement has not yet been taken and transmitted to the front panel meter 24.

Once the front panel indicators and parameters are reset (disabled), the program includes a conventional time delay routine 60 having a 30 second wait loop which is designed to allow the frequency to digital converter 16 to stabilize. Once the 30 second wait is completed, the clear timer interrupt is reset ending the initialization cycle. This function is indicated by block 62.

Block 64 represents the starting point in the program sequence where, once the panel displays are all initialized and reset, that the data from the pulser begins being processed. The pulser is designed to emit pulses at a specified frequency. Should a pulse not be emitted, or should the frequency fall below a specified value, a potentially serious malfunction of the pulser could be the cause. The operator is alerted through one or more of the alarm indicators 44(a)-44(e), such as the low alarm indicator 44(c). Alternatively, if the frequency exceeds the specified value, then another of the alarms 44(a)-44(e), such as the high alarm indicator 44(d) is activated. In order to discriminate between malfunctions, start-up interruptions and actual data interruptions, a watch-dog interrupt timer routine is included and is indicated generally at 66. The entry of each pulse induced signal emitted by the frequency-to-digital converter 16 into the microprocessor 32 is represented at block 64 and triggers the initialization of the watch-dog timer routine indicated at block 68. The trip and error indicators, if activated, are introduced at point 70 (See FIG. 2A) and the watch-dog routine 66 becomes operational.

At block 72, the routine 66 is adapted to receive any signal interrupts emitted by the pulser. At block 74, the routine 66 determines whether or not the input is data related by the frequency of the pulse. If the frequency is lower than a specified range, an error is indicated through the I/O port 44 (see FIG. 1). Block 76 then resets the error trip and begins the routine again in anticipation of the next pulse signal. If block 74 determines that a genuine data interruption has occurred, block 78 reinitializes the watch-dog timer routine in anticipation of the next pulse signal and the front panel frequency meter 24 is turned on at block 80. At the same time, the pulse run light 44(a) (see FIG. 1) is illuminated via a one shot routine, indicating that the pulser is in operation. This is shown at block 82.

Referring now to FIG. 2B, which is a continuation of the flow chart of FIG. 2A, once the pulse column is in operation and the instrument of the invention is properly stabilized, the program of the invention is adapted to select the amplitude or pressure channel (CHAN 1 of the converter 22 in FIG. 1) at block 84. Once the pressure channel is selected, the program reads the RMS amplitude data at block 86. The pressure value is then converted from machine language to engineering units at block 88.

In similar fashion to the procedure of selecting the pressure channel, block 90 is adapted to select the frequency channel (CHAN 0 of the converter 22). Upon the selection of the frequency channel, the pulse frequency is read at block 92. Also in similar fashion to block 88, block 94 converts frequency data from machine language to engineering units and, in addition, the data is linearized.

Following the reading and conversion of the frequency data, the program is then adapted to calculate the column inches using the equation having the general form set forth hereinbelow:

$$\text{Column Inches} = \frac{C}{AK} \sqrt{\frac{1}{2}(\sqrt{K^4 + 4A^2B^2} - K^2)}$$

The constant "C" is dependent on physical characteristics of the particular column. Variables "A and B" are well-known functions of both column weight and the input pulse (RMS) value. The variable "K" is a well-known function of the input pulse frequency. It is believed that the present device has the capability to measure important column operating conditions and then use these values in a defined mathematical expression to obtain a value which is useful for column operating performance.

The pulse column operating parameter of column inches may be calculated either from an empirically derived formula, or from an equation based on the physical specifications of the column similar to the example hereinabove. In either case, the microprocessor 32 of the invention calculates the column inches value using the measured operating parameters of pulse amplitude (RMS) value, pulse frequency and column liquid weight. A significant advantage of the present invention is the employment of the RMS values in the calculation of column inches, in that the RMS value takes into account the duration of the individual pulses and, as such, more accurately reflects the performance and mixing dynamics of the pulse column.

At block 98, the column inches data obtained by the formula is converted to a format which is appropriate for the front panel meters 36 or 38 (see FIG. 1) depending on the calculated column inches value. Upon the display of the calculated column inches value on the front panel meters 36 or 38, the software is adapted to evaluate the calculated value against preset parameters. This is performed at block 100. Should the front panel meter value be greater than the trip parameter, which in the preferred embodiment is depicted as 65,535, the block 100 is adapted to trigger an alarm indicator such as I/O port 44(b) or 44(c) (see FIG. 1) as indicated at block 102 after which program control branches to block 72 of FIG. 1, as indicated. The 65,535 number is the largest binary member obtainable using the above formula, however, it will be appreciated that this trip value will vary with the design and operating parameters of individual pulse columns.

Should the column inches value obtained at block 96 and displayed by block 98 be less than the amount specified in block 100, i.e., in the acceptable range, block 104 calculates the product of column inches times the frequency. If the product is less than zero, and referring now to block 106, block 108 is triggered, which illuminates the error light 44(b) (see FIG. 1) and, if desired, triggers an audible alarm (not shown).

An additional function of block 108 is to reset the high and low alarm indicators 44(c) and 44(d) respectively and trip indicator 44(e) (see FIG. 1) to prepare them for the next calculated value. If the product obtained in block 104 is zero or greater, at block 110 the data is transmitted to the front panel for display. At block 112, should the error light 44(b) remain on from the resetting procedure of block 108, the light is turned off. Lastly, at block 114 the routine is rerun for alarm and trip conditions upon each pulser cycle, i.e., the program repeats from point 70 (see FIG. 2A).

In operation, pulse column pulses are transmitted as signals, then split into a frequency and RMS amplitude paths. The frequency and RMS amplitude data is fed into a microprocessor. The microprocessor is interrupt driven and performs specified column inch calculations and front panel information display updates with each pulse. Updates are thus dependent on pulser frequency and occur approximately every 0.6 second to 2 seconds. These rates are much faster than needed to detect column upsets and prevent them from becoming a serious problem. Each pulse reading is automatically compared against the specified column inch parameters, and alarms are triggered should the pulser operate beyond the specified range. If desired, the microprocessor may be programmed to shut the pulser down in the face of certain alarm conditions. The operator may then take appropriate corrective action to maintain efficient pulse column operation.

While a particular embodiment of the pulse column monitoring instrument of the invention has been shown and described, it will be appreciated by persons skilled in the art that variations and modifications might be made thereto without departing from the invention in its broader aspects and as set forth in the following claims.

The embodiments of this invention in which an exclusive property or privilege is claimed are defined as follows:

1. An instrument adapted to determine chemical pulse column parameters, said pulse column having a column pulser which generates a pressure pulse the parameters of which are transformed by a transducer into a set of voltage signals, said instrument comprising:
   means for receiving said voltage signals induced by pulses emitted by said column pulser and for splitting said signals into first and second components;
   means for processing said first signal component to determine the frequency of said signals and for generating a pulse signal frequency;
   means for processing said second signal component of the pulse induced signals into a root mean square equivalent value; and
   means for processing said pulse signal frequency and said root mean square equivalent, for calculating specified pulse column operating parameters therefrom and for comparing said calculating parameters against preset parameter limits.

2. The instrument as defined in claim wherein said means for receiving pulse induced voltage signals is an instrumentation amplifier.

3. The instrument as defined in claim 1 further including filtering means for filtering said first signal component prior to the transmission thereof to said processing means.

4. The instrument as defined in claim 3 wherein said filtering means is an active filter adapted to remove nearly all frequencies save a fundamental pulse frequency.

5. The instrument as defined in claim 1 wherein said means for processing said first signal component includes a voltage comparator.

6. The instrument as defined in claim 1 further including converting means for converting said pulse signal frequency to digital format.

7. The instrument as defined in claim 6 wherein said converting means is a frequency-to-digital converter including a microprocessor.

8. The instrument as defined in claim 7 further including converting means to convert said digital format pulse signal to analog format.

9. The instrument as defined in claim 8 wherein said converting means is a digital-to-analog converter.

10. The instrument as defined in claim wherein said processing means for said second signal component is an RMS converter adapted to process said signal in analog format.

11. The instrument as defined in claim 10 further including means for filtering said RMS signal.

12. The instrument as defined in claim 11 wherein said filtering means is a two pole active filter.

13. The instrument as defined in claim 1 wherein said means for receiving said pulse signal frequency and said RMS equivalent value is a 4 channel analog multiplexer and analog-to-digital converter.

14. The instrument as defined in claim 13 wherein said means for calculating specified pulse column parameters and comparing same against preset parameters is a microprocessor.

15. The instrument as defined in claim 14 wherein said microprocessor is adapted to generate alarms or process shutdowns when said calculated parameters overrun preset limits.

16. The instrument as defined in claim 13 wherein said microprocessor is connected to a digital-to-analog converter for display of said calculated parameters.

17. The instrument as defined in claim 16 further including at least one recorder adapted to record said calculated parameters.

18. An instrument adapted to determine chemical pulse column parameters, comprising:
   an amplifier adapted to receive voltage signals from a transducer whose electrical signal is induced by said column and to provide a signal gain and offset to an output signal thereof;
   circuit means adapted to split said output signal into first signal component and a second signal component;

a voltage comparator including a microprocessor adapted to compare said first signal component with preset values and to generate a corresponding pulse frequency;

an RMS converter adapted to provide an output proportional to the RMS value of the second signal component;

a microprocessor adapted to receive said pulse signal frequency and said RMS converter output to calculate specified pulse column parameters against preset limits and to trigger alarm means in response to said calculated parameters exceeding said limits; and means for displaying said calculated parameters.

19. A method of determining chemical pulse column parameters comprising:

receiving voltage signals produced by a transducer whose output values are governed by the properties of pressure pulses applied to said column;

splitting said signals into first and second components;

generating a pulse signal frequency from said first component;

processing said second component to obtain the RMS equivalent value thereof and providing said value in signal form;

calculating specified pulse column operating parameters using said pulse signal and said RMS signal; and comparing said calculated operating parameters against preset limits to monitor the condition of the column.

* * * * *